Feb. 9, 1932. F. W. SPREER 1,844,048
MEMORIAL TABLET
Filed April 25, 1931
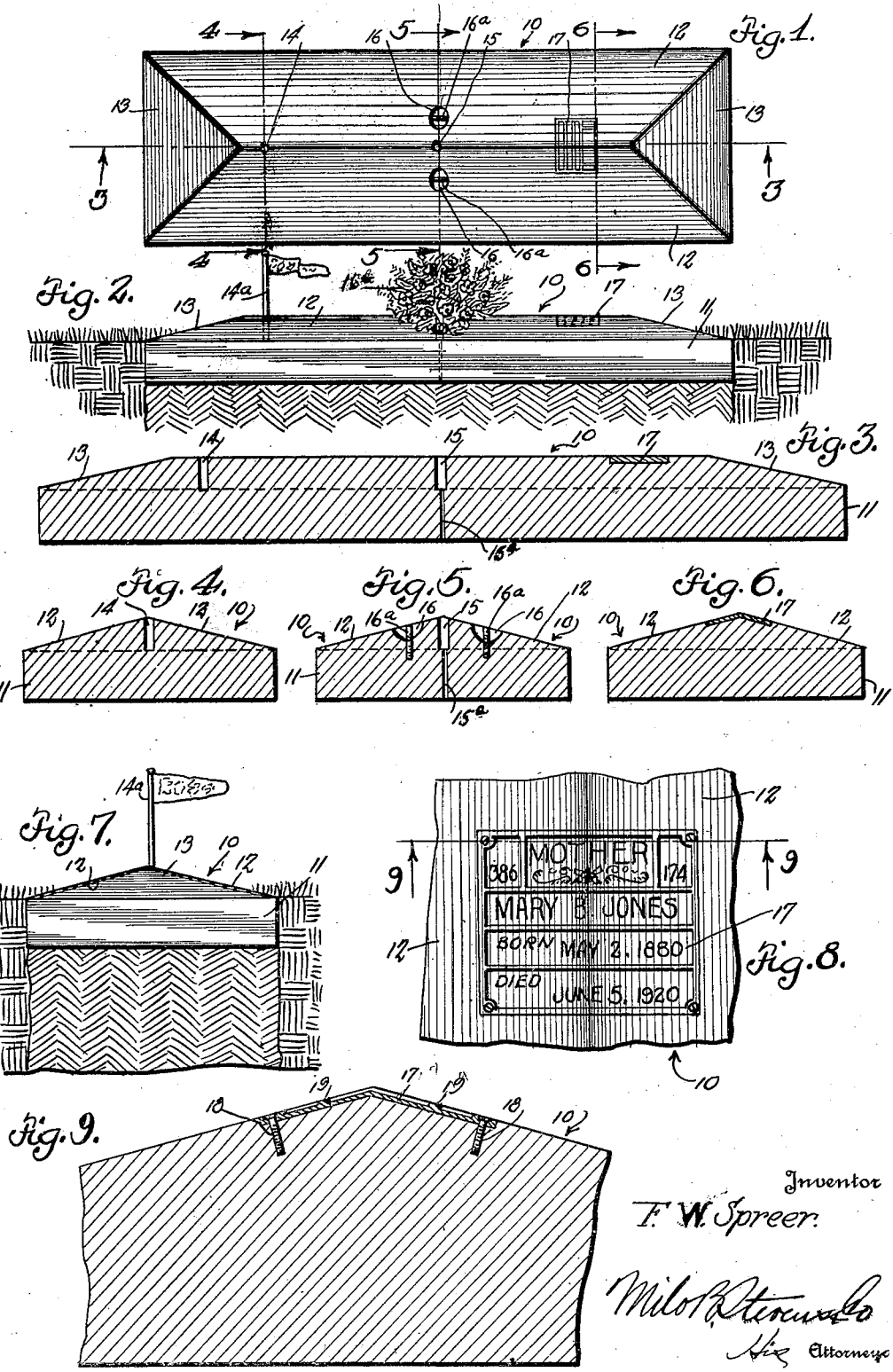
Inventor
F. W. Spreer Patented Feb. 9, 1932

1,844,048

UNITED STATES PATENT OFFICE

FRED W. SPREER, OF HOBART, INDIANA

MEMORIAL TABLET

Application filed April 25, 1931. Serial No. 532,941.

My invention relates to memorial tablets. An important object of my invention is to provide a memorial tablet that acts as a combination grave cover and tombstone.

A further object is to provide a tablet that is permanent, well-drained, and simple in its construction.

A further object is to provide a tablet that will not interfere with the caretaker's work of cutting the grass, in that he may pass over the tablet with a mowing machine without injury to the tablet.

A still further object is to provide a tablet having recesses for flowers and the like, and indicia exhibiting means.

In the accompanying drawings forming a part of this application, and in which like numerals are employed to designate like parts in all views, Figure 1 is a top plan view of the tablet;

Figure 2 is a side view, showing the tablet as applied over a grave;

Figure 3 is a side central longitudinal view of my device taken on the line 3—3 of Figure 1;

Figure 4 is a cross sectional view taken on the line 4—4 of Figure 1;

Figure 5 is a cross sectional view taken on the line 5—5 of Figure 1;

Figure 6 is a cross sectional view taken on the line 6—6 of Figure 1;

Figure 7 is an end view of the tablet embedded over a grave;

Figure 8 is a top fragmentary view of the marker showing the name plate and indicia, and Figure 9 is a cross sectional view taken on the line 9—9 of Figure 8.

In the drawings, wherein for the purpose of illustration, is shown a preferred embodiment of my invention, the numeral 10 designates the tablet made of any durable material, such as granite, concrete, and the like, and having a base 11 adapted to be embedded in the ground and over a grave. The tablet 10 is ridged longitudinally having downwardly sloping sides 12 and is beveled at the ends as shown at 13. This arrangement gives good drainage, since water will run off on all sides, and also allows close cutting of the grass around in the tablet in the caretaking thereof, and it also furnishes a sloping surface for the lawn mower to travel upon for a close cut without affecting a chipping of the tablet's edges. It will be noted that the sloping surfaces flush with the ground since the base 11 is entirely buried in the ground.

Numeral 14 designates a recess in the tablet adapted for use as a holder for a flag, emblem or the like 14$^a$, while located in the center of the tablet is an aperture especially for flowers 15. It will be noted that this recess has drainage means 15$^a$, which leads clear through the tablet to the ground.

Oppositely spaced from the aperture 15 are recesses 16 having sunken anchors or other fastening means 16$^a$ adapted to hold wreaths, sprays, etc. 16$^b$ upon the tablet.

Numeral 17 shows a name plate embedded in the tablet and anchored to the same by means of bolts 18. The recesses for the name plate and bolts, of course, being provided for in the construction of the tablet. As will be seen in Figure 8, this name plate, which is of an inverted V-shape, contains space for various identification purposes which are set off by ribs or guides 19.

As will be readily seen, by embedding my tablet over a grave, I provide a cover and a marker, or tombstone, for the name, thus doing away with the conventional upstanding tombstone which in time becomes unsightly since usually one end of the same sinks, causing the stone to become out of line. My marker acts also as a complete cover for the grave and allows easy taking care thereof, and is also neat, simple and practical. The recesses in the marker do away with the unsightly-looking holders now stuck over a grave, and the raised longitudinal ridge, the beveled ends and the downwardly sloping sides present a marker that can be distinguished, in that it does not have a flat top surface, and can be easily seen from a distance. Further, the sloping sides add to the beauty of the marker, and at the same time allows no water to accumulate thereon, thus preventing the slab from deteriorating and assuring a much longer life of the marker.

It is to be understood that the form of my invention herewith shown and described is to be taken as a preferred embodiment of the same, and that various changes in the shape, size, and arrangement of parts may be resorted to without departing from the spirit of my invention, or the scope of the subjoined claims.

Having thus described my invention, what I claim is:

1. A grave cover adapted to be embedded in the ground, a raised rib extending above the ground, sloping surfaces leading therefrom and having recesses therein; and an inverted V-shaped name plate attached to the raised rib.

2. A device of the character described comprising a base, a longitudinally raised portion having recesses therein, sloping surfaces leading downwardly from said raised portion to the level of the ground, and having recesses therein, fastening means located in said recesses, and indicia-exhibiting means attached to said raised portion and of a substantially inverted V-shape.

3. A longitudinal raised rib marker having recesses therein, longitudinal sloping sides having recesses, fastening elements located in said recesses, end beveled sides, and an anchored name plate having guide ribs for holding various indicia.

4. A combination tombstone and grave cover comprising a longitudinal flat base, a raised central longitudinal portion in the top thereof, downwardly sloping sides and leading to the level of the ground, article holding means located on said rib and on the slopes thereof, drainage means located in the bottom of one of said recesses, and an inverted V-shaped name plate attached to the longitudinal raised rib.

5. In a device of the character described, a base adapted to be embedded in the ground, a central raised portion and plane surfaces leading from said portion downwardly to the ground, and article holding means located therein.

In testimony whereof I affix my signature.

FRED W. SPREER.